United States Patent
Chin

(10) Patent No.: US 10,803,686 B2
(45) Date of Patent: Oct. 13, 2020

(54) VEHICLE AND VEHICLE SYSTEM

(71) Applicants: Hyundai Motor Company, Seoul (KR); Kia Motors Corporation, Seoul (KR)

(72) Inventor: Kyuhwan Chin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 15/835,677

(22) Filed: Dec. 8, 2017

(65) Prior Publication Data

US 2019/0130681 A1 May 2, 2019

(30) Foreign Application Priority Data

Oct. 26, 2017 (KR) .................. 10-2017-0140053

(51) Int. Cl.
*G07C 9/00* (2020.01)
*B60R 25/24* (2013.01)

(52) U.S. Cl.
CPC .......... *G07C 9/00309* (2013.01); *B60R 25/24* (2013.01); *B60R 25/245* (2013.01); *B60R 2325/10* (2013.01); *G07C 2009/0088* (2013.01); *G07C 2009/00523* (2013.01); *G07C 2009/00539* (2013.01); *G07C 2009/00547* (2013.01); *G07C 2009/00825* (2013.01); *G07C 2009/00976* (2013.01); *G07C 2209/63* (2013.01)

(58) Field of Classification Search
CPC ... G07C 9/00309; B60R 25/24; B60R 25/245; B60R 2325/10
See application file for complete search history.

(56) References Cited

U.S. PATENT DOCUMENTS

| 6,253,980 | B1 * | 7/2001 | Murakami | B60R 25/1012 224/510 |
|---|---|---|---|---|
| 6,636,145 | B1 * | 10/2003 | Murakami | G07B 15/00 340/5.42 |
| 7,568,616 | B2 * | 8/2009 | Zuili | G06Q 20/341 235/382 |
| 8,467,770 | B1 * | 6/2013 | Ben Ayed | H04L 63/107 455/411 |
| 8,805,434 | B2 * | 8/2014 | Vasudevan | B60R 25/24 455/550.1 |
| 2003/0034873 | A1 * | 2/2003 | Chase | G06Q 10/02 340/5.2 |
| 2004/0010338 | A1 * | 1/2004 | Ogura | G06Q 10/02 700/214 |
| 2004/0014423 | A1 * | 1/2004 | Croome | H04L 63/08 455/41.2 |
| 2005/0081040 | A1 * | 4/2005 | Johnson | G06F 21/10 713/176 |
| 2013/0200999 | A1 * | 8/2013 | Spodak | G05B 1/01 340/5.65 |

(Continued)

*Primary Examiner* — Behrang Badii
*Assistant Examiner* — Daniel L Greene
(74) *Attorney, Agent, or Firm* — Mintz Levin Cohn Ferris Glovsky and Popeo, P.C.; Peter F. Corless

(57) ABSTRACT

A vehicle includes a controller generating a first signal; and a communicator transmitting the first signal to an external server, and receiving a second signal from a smart card storing the second signal, the second signal being generated based on the first signal. The controller authorizes the smart card to control the vehicle based on the first signal and the second signal.

17 Claims, 14 Drawing Sheets

(56) References Cited

U.S. PATENT DOCUMENTS

| | | | |
|---|---|---|---|
| 2016/0203661 A1* | 7/2016 | Pudar | B60R 25/24 |
| | | | 340/5.25 |
| 2016/0217635 A1* | 7/2016 | Pudar | B60R 25/24 |
| 2017/0178035 A1* | 6/2017 | Grimm | H04L 67/12 |
| 2018/0189566 A1* | 7/2018 | Grimm | G06K 9/00671 |
| 2019/0028487 A1* | 1/2019 | Romer | H04L 63/08 |
| 2019/0047511 A1* | 2/2019 | Link, II | B60R 25/24 |

* cited by examiner (a)

(b)

VEHICLE AND VEHICLE SYSTEM

CROSS-REFERENCE TO RELATED APPLICATION

This application claims the benefit of priority to Korean Patent Application No. 10-2017-0140053, filed on Oct. 26, 2017 in the Korean Intellectual Property Office, the disclosure of which is incorporated herein by reference in its entirety as if fully set forth herein.

BACKGROUND

1. Technical Field

Embodiments of the present disclosure relate generally to vehicle systems including a vehicle and a server, and more particularly, to a vehicle system capable of controlling a vehicle by using a smart card.

2. Description of the Related Art

Modern vehicles are equipped with several electronic devices, such as hands-free devices, Global Positioning System (GPS) receivers, Bluetooth devices, high-pass devices, and the like, which have been developed for enhancing the convenience of drivers. For example, in the past a key has been required to open a vehicle door or start an engine of the vehicle. Recently, a technology for operating the vehicle remotely using an external terminal device has been developed.

A remote control system of a vehicle refers to a system in which a driver may control operation of the vehicle remotely, such as opening and closing a door of a vehicle, starting the vehicle, and the like, without inserting a key into a key box of the vehicle. When a driver carrying the remote control device approaches the vehicle, the door of the vehicle can be automatically unlocked through low frequency (LF; Bluetooth) communication and radio frequency (RF; Bluetooth) communication with the remote control device, so that the driver may open the door without inserting the key, and may start the vehicle without inserting the key in the ignition.

A device such as a smart phone or a fob for wireless communication can be used as the remote control device. For demonstration purposes, the remote control device will be referred to herein as a remote control device. However, the remote control device may include a fob key, a smart key, a mobile device, or the like.

The remote control device is required to be supplied with power to perform near-field communication with the vehicle. When the battery of the remote control device is fully discharged, however, it is impossible to perform operations such as door open and ignition functions of the vehicle. Therefore, a user is often concerned about a power state of the remote control device. In addition, there is no device to replace the remote control device when the remote control device is inoperable due to a failure.

SUMMARY

In order to solve the problems of the related art as described above, it is an aspect of the present disclosure to provide a vehicle in which a user may easily control the vehicle using an auxiliary device such as a smart card.

In addition, it is another aspect of the present disclosure to provide a vehicle capable of effectively preventing vehicle theft that may occur when the smart card is lost or stolen.

Additional aspects of the disclosure will be set forth in part in the description which follows and, in part, will be apparent from the description, or may be learned by practice of the disclosure.

In accordance with embodiments of the present disclosure, a vehicle includes: a controller generating a first signal; and a communicator transmitting the first signal to an external server, and receiving a second signal from a smart card storing the second signal, the second signal being generated based on the first signal. The controller authorizes the smart card to control the vehicle based on the first signal and the second signal.

The controller may authorize the smart card to control the vehicle when the second signal is generated based on the first signal.

The controller may authorize the smart card to control at least one of a door, a trunk, and a power source of the vehicle when the smart card is authorized to control the vehicle.

The vehicle may further include a storage storing the first signal, wherein the controller may control the storage so as to store information of the smart card when the smart card is authorized to control the vehicle.

The controller may delete the information of the smart card stored in the storage when another smart card is authorized by the controller to control the vehicle.

The first signal may include unique information of the vehicle distinguished from unique information of other vehicles.

The controller may authorize the smart card to control the vehicle based on whether information obtained from the first signal is included in the second signal.

The vehicle may further include a sensing unit sensing the smart card. The controller may authorize the smart card to control the vehicle when the smart card is sensed by the sensing unit.

The sensing unit may be disposed in at least one of an ignition button, a door, a handle, a center fascia, and a display of the vehicle.

The controller may authorize the smart card to control the vehicle when a remote control device of the vehicle is present in an interior of the vehicle.

Furthermore, in accordance with embodiments of the present disclosure, a vehicle system includes: a vehicle including a controller generating a first signal and a communicator transmitting the first signal; and a server receiving the first signal from the communicator, generating a second signal based on the first signal and storing the generated second signal in a smart card. The communicator receives the second signal from the smart card, and the controller authorizes the smart card to control the vehicle based on the first signal and the second signal.

The controller may authorize the smart card to control the vehicle when the second signal is generated based on the first signal.

The controller may authorize the smart card to control at least one of a door, a trunk, and a power source of the vehicle when the smart card is authorized to control the vehicle.

The vehicle system may further include a storage storing the first signal. The controller may control the storage so as to store information of the smart card when the smart card is authorized to control the vehicle.

The first signal may include unique information of the vehicle distinguished from unique information of other vehicles.

The controller may authorize the smart card to control the vehicle based on whether information obtained from the first signal is included in the second signal.

The server may generate a plurality of second signals, each of which including different information, when a plurality of first signals are received from the communicator.

The server may store the plurality of second signals in a plurality of smart cards, respectively.

The controller may control the storage so as to store information of a plurality of smart cards when the plurality of smart cards are authorized to control the vehicle.

The controller may delete the information of the smart card stored in the storage when another smart card is authorized by the controller to control the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
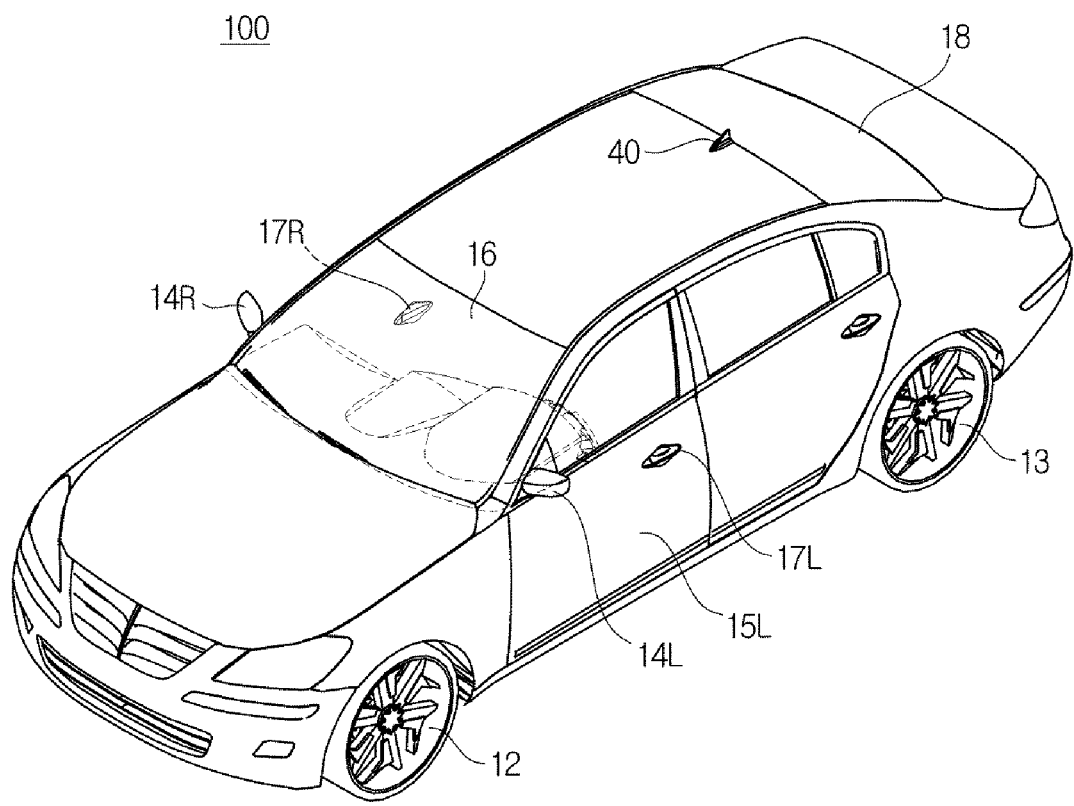
FIG. 1 is a view illustrating the exterior of a vehicle in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments described herein and configurations illustrated in the accompanying drawings are only certain examples of the present disclosure, and various modifications may be made at the time of filing of the present application to replace the embodiments and drawings of the present specification.

In addition, terms used herein are intended to describe certain embodiments only, and shall by no means restrict and/or limit the present disclosure. Unless clearly used otherwise, expressions in a singular form include a meaning of a plural form.

In the present specification, terms such as "comprising", "having" or "including" are intended to designate the presence of characteristics, numbers, steps, operations, elements, parts or combinations thereof, and shall not be construed to preclude any possibility of presence or addition of one or more other characteristics, numbers, steps, operations, elements, parts or combinations thereof.

In addition, although terms including ordinal numbers such as "first" or "second" may be used herein to describe various elements, the elements should not be limited by such terms. As used herein, the singular forms "a," "an," and "the" are intended to include the plural forms as well, unless the context clearly indicates otherwise. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in detail with reference to the accompanying drawings so that those skilled in the art may easily implement the present disclosure. In the drawings, portions irrelevant to the description will not be shown in order to clearly describe the present disclosure. Hereinafter, a vehicle equipped in accordance with embodiments of the present disclosure will be described with reference to FIGS. 1 and 2.

Figure 2:
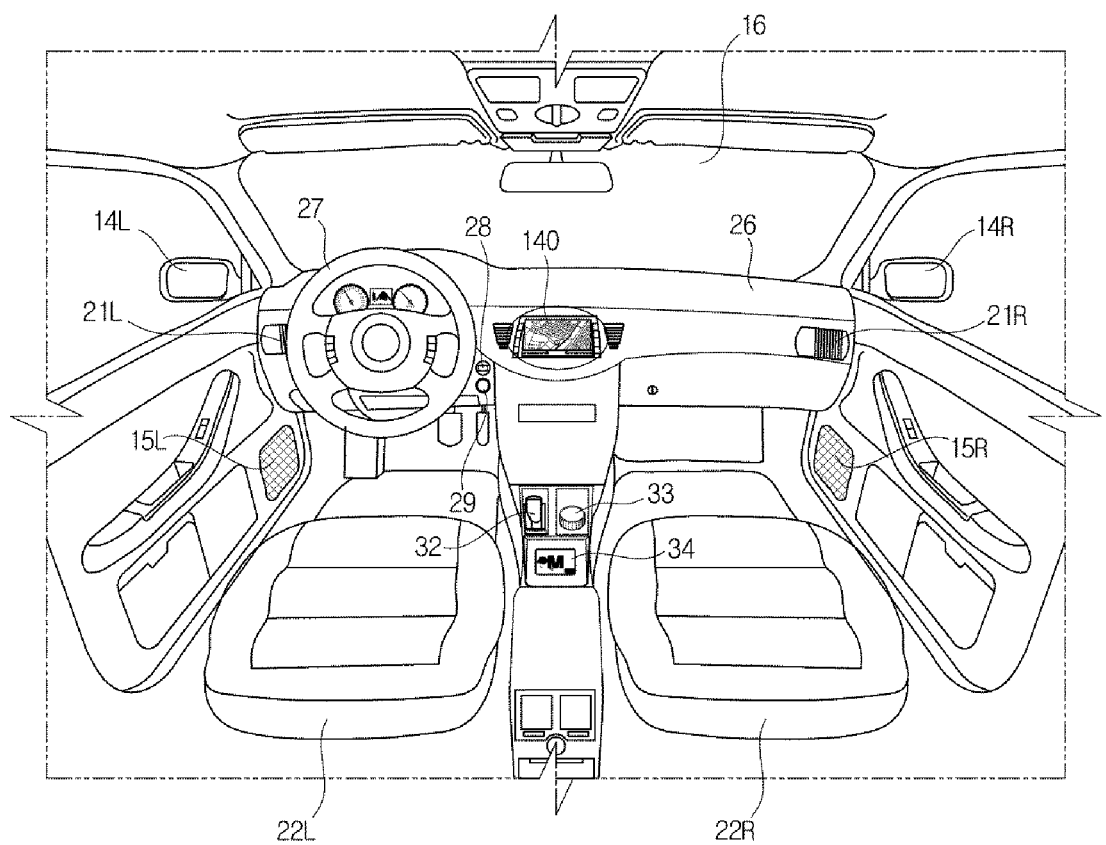
FIG. 2 is a view illustrating the interior of the vehicle in accordance with embodiments of the present disclosure.

FIG. 1 is a view illustrating the exterior of a vehicle in accordance with embodiments of the present disclosure, and FIG. 2 is a view illustrating the interior of the vehicle in accordance with embodiments of the present disclosure. Hereinafter, the description will be made with reference to FIGS. 1 and 2 in order to avoid redundancy in description of the same content.

As shown in FIG. 1, in a vehicle 100 in accordance with embodiments of the present disclosure, wheels 12 and 13 configured to move the vehicle 100, a door 15L configured to shield an interior of the vehicle 100 from the outside, a front glass 16 configured to provide a field of vision in a forward direction of the vehicle 100 to a user in the interior of the vehicle 100, and side mirrors 14L and 14R configured to provide a field of vision in a rear direction of the vehicle 100 to the user may be provided at the exterior thereof.

The wheels 12 and 13 include a front wheel 12 provided at a front side of the vehicle and a rear wheel 13 provided at a rear side of the vehicle, and a driving device (not shown) provided in the interior of the vehicle 100 provides a rotational force to the front wheel 12 or the rear wheel 13 so that the vehicle 100 moves forward or rearward. Such a driving device may employ an engine configured to generate a rotational force by burning a fossil fuel, or a motor configured to generate a rotational force by receiving power from a capacitor.

Doors 15L and 15R that allow the user or a passenger to board in the interior of the vehicle 100 when opened, and shield the interior of the vehicle 100 from the outside when closed are pivotly provided on left and right sides of the vehicle 100. In addition, handles 17L and 17R capable of opening and closing the doors 15L and 15R may be provided at the exterior of the vehicle 100, and a Bluetooth antenna capable of transmitting a Bluetooth (low frequency) signal and a touch sensing unit (not shown) capable of recognizing a touch input of the user may be mounted on the handle 17L.

When the touch sensing unit of the doors 15L and 15R senses the touch input of the user while the user is carrying a remote control device (not shown), the vehicle 100 performs authentication with the remote control device (not shown) through a wireless communication network. When the authentication is completed, a door lock of the vehicle 100 is released, so that the user can open the door 15L by pulling the handles 17L and 17R. At this time, the user may be the passenger seated in the interior of the vehicle 100 as well as the user herself or himself.

The front glass 16 is provided on an upper front side of a body to allow the user in the interior of the vehicle 100 to acquire visual information from in front of the vehicle 100, and is also called a windshield glass.

In addition, the side mirrors 14L and 14R include a left side mirror 14L provided on the left side of the vehicle 100 and a right side mirror 14R provided on the right side of the vehicle 100, and allow the user in the interior of the vehicle 100 to acquire visual information from beside and behind the vehicle 100.

In addition to the above devices, the vehicle 100 may include a sensing device such as a proximity sensor configured to sense an obstacle or other vehicles behind or beside it and a rain sensor configured to sense precipitation and an amount of precipitation.

The proximity sensor may transmit a sensing signal to the sides or rear of the vehicle, and may receive a reflection signal reflected from an obstacle such as another vehicle. Based on a waveform of the received reflection signal, the presence or absence of the obstacle to the sides or rear of the vehicle 100 may be sensed, and a location of the obstacle may be detected. As an example of such a proximity sensor, a method of transmitting ultrasonic waves or infrared rays to detect a distance to an obstacle by using ultrasonic waves or infrared rays reflected from the obstacle may be employed.

It should be understood that the exterior of the vehicle 100 as described above and illustrated in FIG. 1 is provided merely for demonstration purposes, and thus does not limit the scope of the present disclosure.

As shown in FIG. 2, a display 140 configured to display a video or an image provided from an audio-video-navigation (AVN) terminal may be provided in a central region of a dashboard 26. The display 140 may selectively display at least one of an audio screen, a video screen, and a navigation screen, as well as various control screens related to the vehicle 100 or a screen related to an additional function.

The display 140 may be implemented as a liquid crystal display (LCD), a light emitting diode (LED), a plasma display panel (PDP), an organic light emitting diode (OLED), a cathode ray tube (CRT), or the like.

In addition, a center inputter 33 of a jog shuttle type may be provided between a driver's seat 18L and a passenger seat 18R. The user may input a control command by rotating or pressing the center inputter 33, or pushing the center inputter 33 in up, down, left, or right.

A speaker 20 capable of outputting sound may be provided in the vehicle 100.

The speaker 20 may output sound required for performing an audio function, a video function, a navigation function, and other additional functions.

In FIG. 2, the speaker 20 includes speakers 20L and 20R corresponding to the driver's seat 18L and the passenger's seat 18R, respectively, but embodiments are not limited thereto. The speaker 20 may be provided at various locations in the interior of the vehicle.

A steering wheel 27 is provided on the dashboard 26 on the side of the driver's seat 18L, and a key groove 28 into which a remote control device 400 (e.g., a fob key) is inserted may be formed in a region adjacent to the steering wheel 27. An external terminal may be connected to the vehicle 100 when the remote control device 400 capable of turning on/off an ignition of the vehicle 100 is inserted into the key groove 28, or authentication between the remote control device 400 and the vehicle 100 is completed through the wireless communication network.

In addition, an ignition button 29 for controlling an on/off state of the ignition of the vehicle 100 may be provided on the dashboard 26. The user may turn on the ignition of the vehicle 100 by pressing the ignition button 29 when the remote control device 400 is inserted into the key groove 28, or authentication between the external terminal (not shown) and the vehicle 100 is successful through the wireless communication network.

Meanwhile, an air conditioner that performs both heating and cooling may be provided in the vehicle 100, and the temperature inside the vehicle 100 may be controlled by discharging heated or cooled air through an air vent 21.

In FIG. 2, the air vent 21 includes air vents 21L and 21R corresponding to the driver's seat 18L and the passenger's seat 18R, respectively, but embodiments are not limited thereto. The air vent 21 may be provided at various locations in the interior of the vehicle.

It should be understood that the interior of the vehicle 100 as described above and illustrated in FIG. 3 is provided merely for demonstration purposes, and thus does not limit the scope of the present disclosure.

Figure 3:
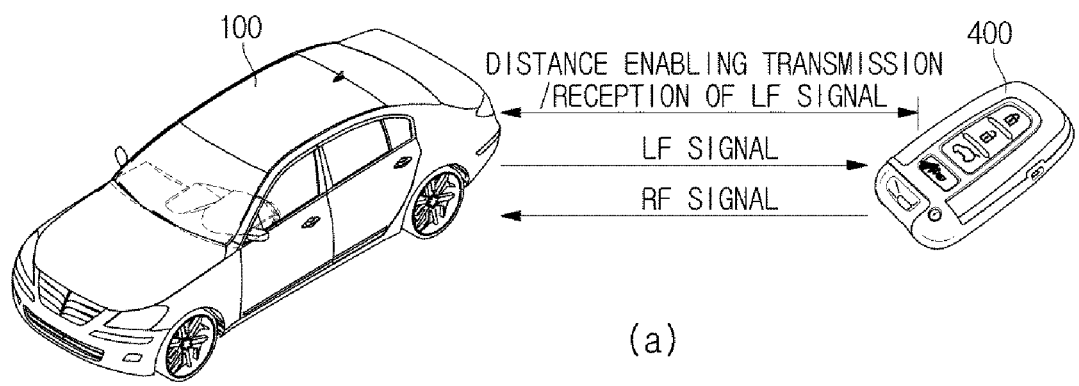
FIG. 3 is a view illustrating a state in which a remote control device and a smart card communicate with the vehicle in accordance with embodiments of the present disclosure.
Figure 3:
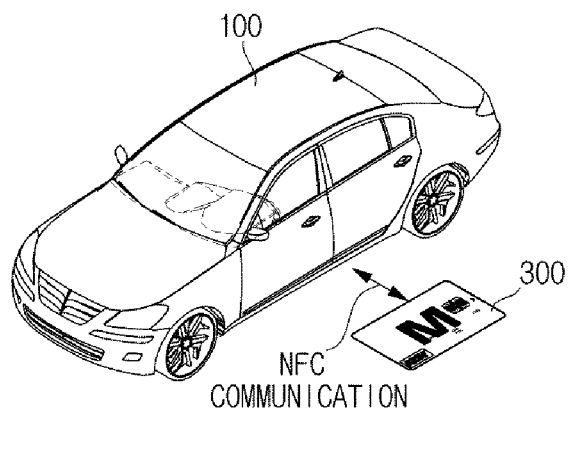

FIG. 3 is a view illustrating one example of the vehicle 100, and the remote control device 400 and a smart card 300 configured to communicate with the vehicle 100 in accordance with embodiments of the present disclosure.

The remote control device 400 may directly come into contact with the vehicle 100, or may be connected to the vehicle 100 through transmission and reception of a wireless signal.

As one example shown in section (a) of FIG. 3, the remote control device 400 may be a fob key connected to the vehicle 100 to release the door lock or enable the vehicle 100 to be started and driven. The remote control device 400 in the example shown in FIG. 3 is not limited to the fob key, but may include any input device configured to control the vehicle 100, such as to release the door lock or enable the vehicle 100 to be started and driven as described above.

For example, when a mobile device serves as the remote control device, the remote control device of the present disclosure may include the mobile device. In this case, an application capable of enabling the mobile device to perform an operation as the remote control device 400 may be installed in the mobile device.

The remote control device 400 may be sold together with the vehicle 100, and authentication information required for connecting the remote control device 400 with the vehicle 100 may be stored in advance.

The remote control device 400 and the vehicle 100 may transmit and receive a signal through a low frequency (LF) communication network and a radio frequency (RF) communication network in order to perform a mutual authentication procedure.

The LF communication network is a communication network having a low frequency band used for transmitting an LF signal required for allowing the vehicle 100 to search for the remote control device 400, and may be, for example, a communication network having a frequency band of 20 kHz or more and 150 kHz or less.

When the LF signal is transmitted/received through the LF communication network, a distance enabling the transmission/reception of a signal is shorter than a distance enabling transmission/reception in the RF communication network having a high frequency band because of characteristics due to the low frequency band. For example, the distance enabling the transmission/reception of the LF signal may be about 5 m, and a distance enabling transmission/reception of an RF signal may be about 100 m.

Therefore, the vehicle 100 may search for the remote control device 400 in proximity of the vehicle 100 and request information required for the authentication by transmitting the LF signal through the LF communication network.

When the vehicle 100 transmits the LF signal through LF antennas (not shown), the remote control device 400 in accordance with embodiments of the present disclosure may receive the LF signal transmitted from each of the LF antennas.

The RF communication network is a communication network having a frequency band for allowing the vehicle 100 to receive the RF signal from the remote control device 400 that has received the LF signal, and may be, for example, a communication network having an ultra-high frequency (UHF) band of 300 MHz or more and 450 MHz or less. When the RF signal is transmitted and received through the RF communication network, a distance enabling the transmission/reception of the signal is longer than a distance enabling transmission/reception in the LF communication network having a low frequency band.

Section (b) of FIG. 3 is a view illustrating a state in which the smart card 300 is used to communicate with the vehicle 100.

Since an existing remote control device 400 is required to be supplied with power to perform the near-field communication with the vehicle 100, when the battery of the remote control device 400 is fully discharged, there are many difficulties for the user to control the vehicle 100 using the remote control device 400. In addition, since there is no device to replace the remote control device 400 when the remote control device 400 is inoperable due to a failure in the remote control device 400, there are many difficulties for the user to use the vehicle 100.

However, when the smart card 300 is used as an auxiliary device as in the vehicle 100 in accordance with one embodiment, the vehicle 100 may be controlled using the smart card 300 even when the battery of the remote control device 400 is fully discharged or the remote control device 400 is inoperable. In addition, when valet parking is required, a parking agent may be provided with the smart card 300 instead of the remote control device 400, so that a security problem of the user may be solved.

When the user uses the smart card 300 to enter or exit the vehicle 100 or to turn on/off the power of the vehicle 100, the user brings the smart card 300 into contact with the door 15 of the vehicle 100 or places the smart card 300 near the door 15 of the vehicle 100 as shown in section (b) of FIG. 3, and a sensor (not shown) mounted in the door 15 communicates with the smart card 300 to determine whether the smart card 300 has authority to control the vehicle 100.

The smart card 300 may have its own power supply device, or may communicate with the vehicle 100 using power induced from a near-field communication module of the vehicle 100 without its own power supply.

In addition, a display (not shown) capable of providing the user with information about the vehicle 100, or a device capable of sensing biometric information may be provided in the smart card 300 in order to prevent a user other than an owner of the vehicle 100 from using the vehicle 100.

However, since the smart card 300 is very thin with a thickness of usually 1 mm or less, there is a possibility that the smart card 300 may be lost or stolen while the user is carrying the smart card 300. Therefore, it is necessary to provide an apparatus or method for preventing other people from using the vehicle by acquiring the card when the smart card 300 is lost by or stolen from the user.

Therefore, the vehicle 100 and a vehicle system 200 in accordance with one embodiment are designed to solve such a problem, and intended to provide a technology that allows the user to register and use the smart card 300 in the vehicle 100 more safely.

Figure 4:
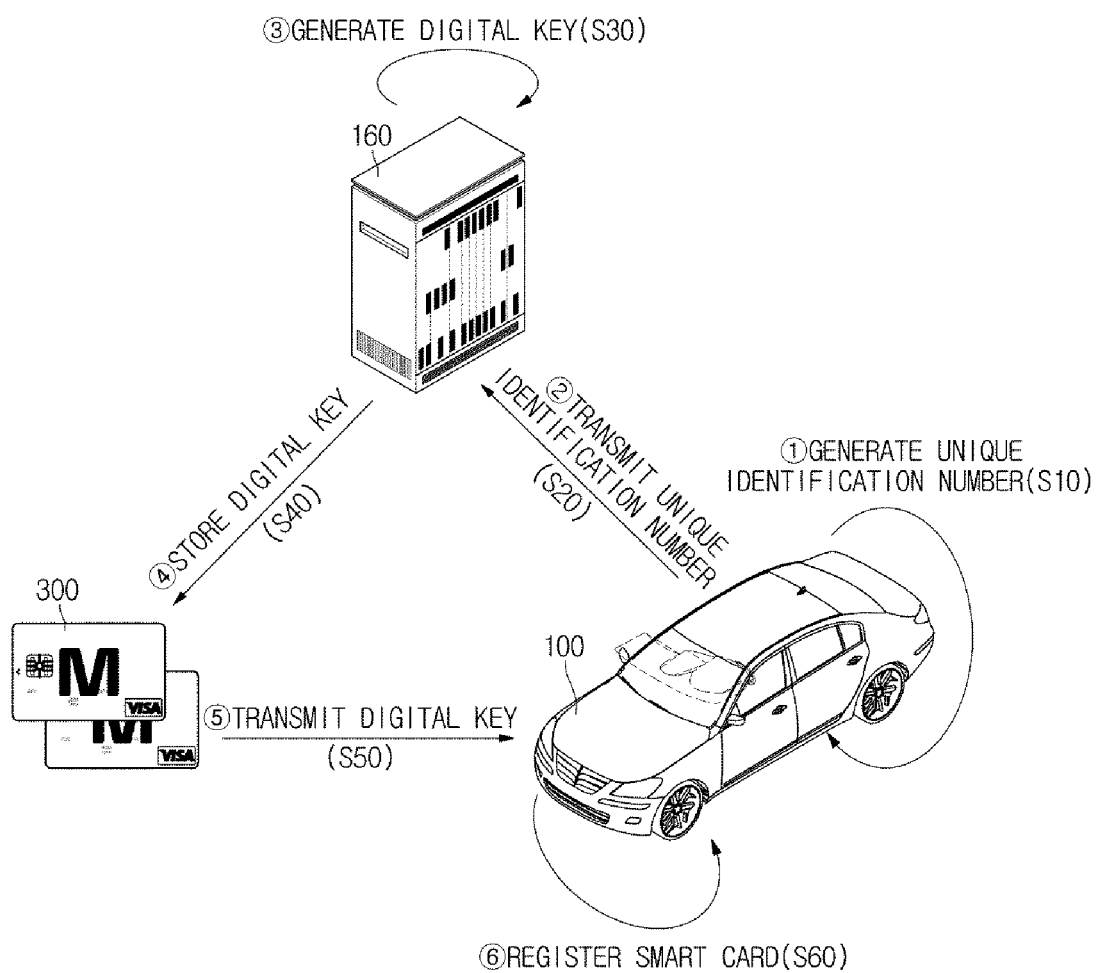
FIG. 4 is a view schematically illustrating an operating sequence of a vehicle system in accordance with embodiments of the present disclosure.

FIG. 4 is a view schematically illustrating an operational flow of the vehicle system 200 in accordance with embodiments of the present disclosure.

As shown in FIG. 4, the vehicle 100 may generate a first signal including unique identification information of the vehicle 100 (S10).

In detail, the unique identification information may be generated during a process of manufacturing the vehicle 100, and the unique identification information may represent a unique value capable of distinguishing the vehicle 100 from other vehicles. The generated unique identification information may be safely stored in the vehicle 100.

Thereafter, the vehicle 100 may transmit the generated first signal to a server 160 (S20). The server 160 which has received the first signal from the vehicle 100 may generate a second signal based on the first signal (S30).

In detail, the second signal may include a digital key required to issue the smart card 300, and the second signal may include information obtained from the first signal. In addition, the generated second signal and the first signal received from the vehicle 100 may be safely stored in the server 160.

Next, the generated second signal may be stored in the smart card 300 (S40).

In detail, upon the issuance of the smart card 300, the smart card 300 may be issued with the second signal being stored in the smart card 300 (S40).

Then, when the user intends to control the vehicle 100 using the smart card 300, the vehicle 100 may receive the second signal, in particular, the second signal including the digital key from the smart card 300 (S50).

Thereafter, the vehicle 100 determines whether the smart card 300 has the authority to control the vehicle based on the first signal and the second signal stored in the vehicle 100, and when the smart card 300 is determined to have the authority to control the vehicle, the smart card 300 may be registered in the vehicle 100 (S60).

In detail, the vehicle 100 may determine whether the smart card 300 has the authority to control the vehicle 100 by checking whether the second signal received from the smart card 300 is generated based on the first signal.

For example, when a unique identification value generated in operations S10 to S30 is A, and a value obtained from A by the server is B, the vehicle 100 may analyze B to determine whether B is a value obtained from A.

When B received from the smart card 300 is a value obtained from A, the smart card 300 may be determined as a card of the user, so that information on the smart card 300 can be stored in the vehicle 100.

However, when it is determined that B received from the smart card 300 is not a value obtained from A, the smart card 300 does not correspond to the card of the user, so that the smart card 300 does not go through a registration procedure.

Figure 5:
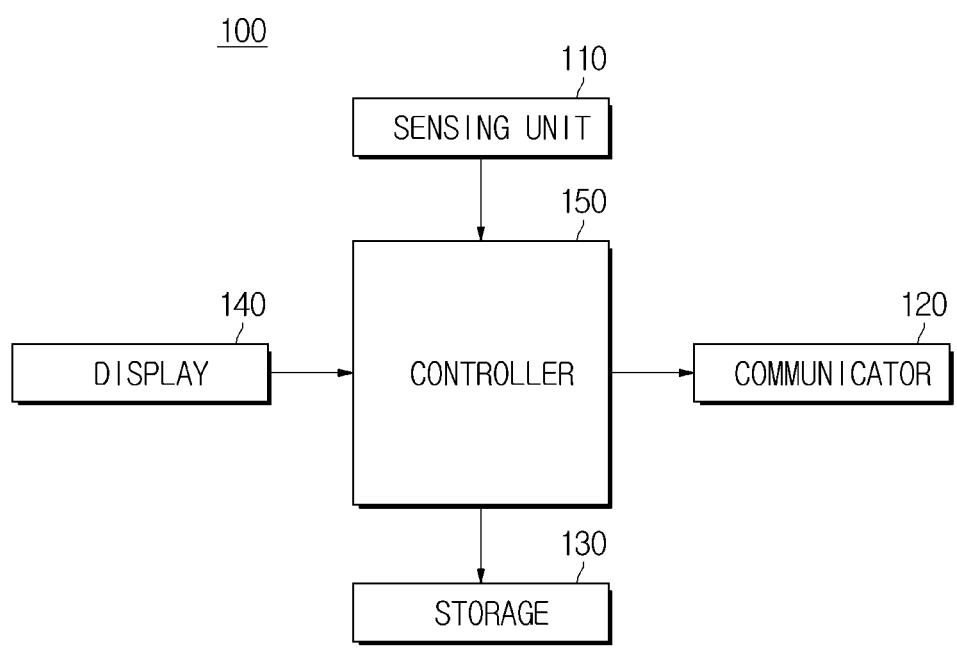
FIG. 5 is a block diagram illustrating elements of the vehicle in accordance with embodiments of the present disclosure.
Figure 6:
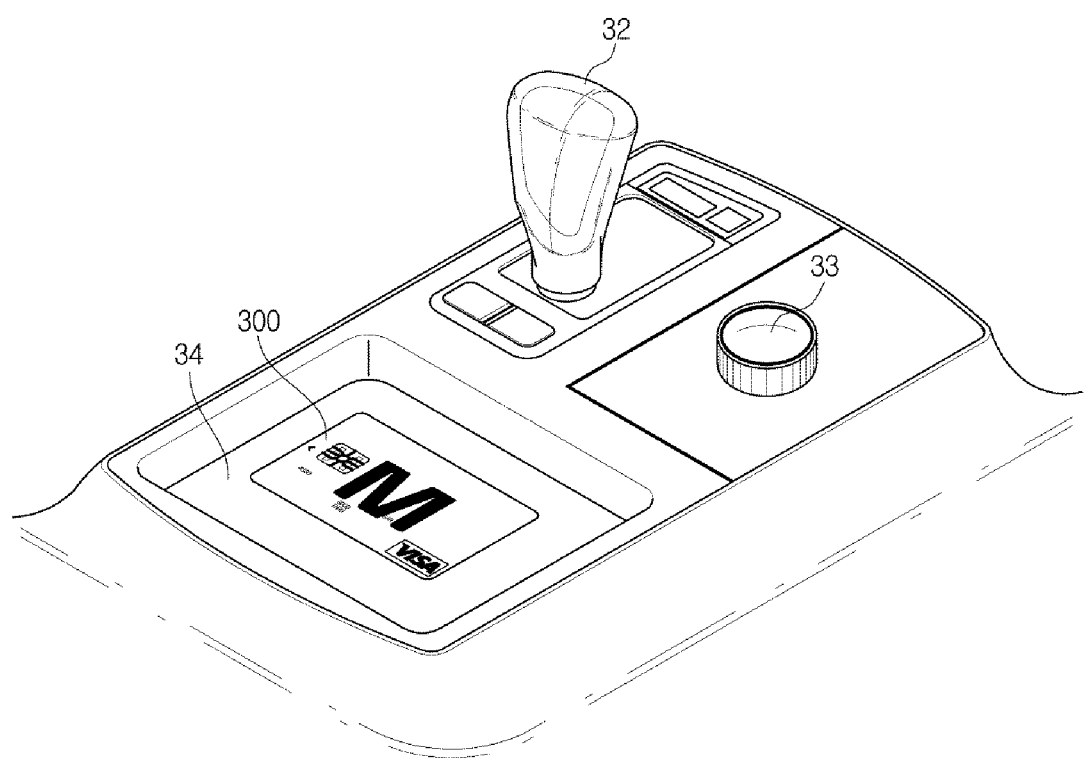
FIGS. 6 to 8 are views illustrating various locations where a sensing unit may be provided in accordance with embodiments of the present disclosure.

FIG. 5 is a block diagram illustrating elements of the vehicle 100 in accordance with embodiments of the present disclosure, and FIG. 6 is a view illustrating various locations where a sensing unit 110 may be provided in accordance with embodiments of the present disclosure.

As shown in FIG. 5, the vehicle 100 in accordance with embodiments of the present disclosure may include the sensing unit 110 capable of sensing a smart card 300 and a remote control device 400, a communicator 120 configured to transmit a first signal to a server 160 and receive a second signal from the smart card 300, a storage 130 configured to store information about a user and the smart card, a display 140 configured to display various information about the vehicle 100, and a controller 150 configured to perform a registration procedure for the smart card 300 based on the first signal stored in the storage 130 and the second signal received from the smart card 300.

The sensing unit 110 may sense biometric information of the user, and may acquire the sensed biometric information of the user when the biometric information is sensed.

In detail, the sensing unit 110 may sense locations of the smart card 300 and the remote control device 400 through sensors (not shown) installed at various locations in the vehicle 100.

In detail, the sensing unit 110 may transmit a sensing result to the communicator 120 and the controller 150 when the smart card 300 is sensed.

Therefore, only when the smart card 300 is sensed by the sensing unit 110, the registration procedure of the smart card 300 may be performed, and the registration procedure of the smart card 300 may not be performed when the smart card 300 is not sensed.

In addition, as will be described below, in order to safely perform the registration procedure of the smart card 300, the registration procedure of the smart card 300 may be performed only when the remote control device 400 of the vehicle 100 is present in the interior of the vehicle 100. Therefore, when it is determined by the sensing unit 110 that the remote control device 400 is not present in the interior of the vehicle 100, the registration procedure of the smart card 300 may not be performed.

Therefore, a sensor of the sensing unit 110 may be provided at various locations of the vehicle 100. As shown in FIG. 6, the sensor of the sensing unit 110 may be provided in a center fascia of the vehicle 100. FIG. 6 illustrates that the sensor is provided in a place where a wireless charger 34 capable of wirelessly charging a battery of a mobile terminal is provided, but not embodiments are limited thereto. The sensor capable of sensing the smart card 300 may be provided at any place in the center fascia.

Figure 7:
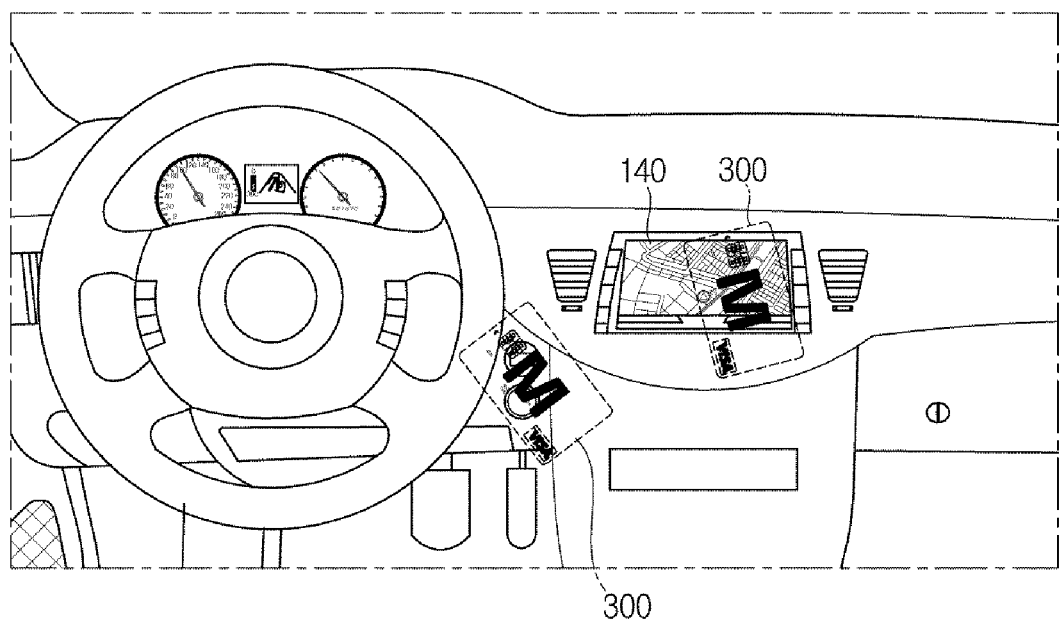

In addition, the sensor may be located in the ignition button 29 or the display 140 as shown in FIG. 7 so that the user may easily bring the smart card 300 into contact with the sensor. Therefore, the user may perform the registration procedure of the smart card 300 by bringing the smart card 300 into contact with the ignition button 29 or the display 140.

Figure 8:
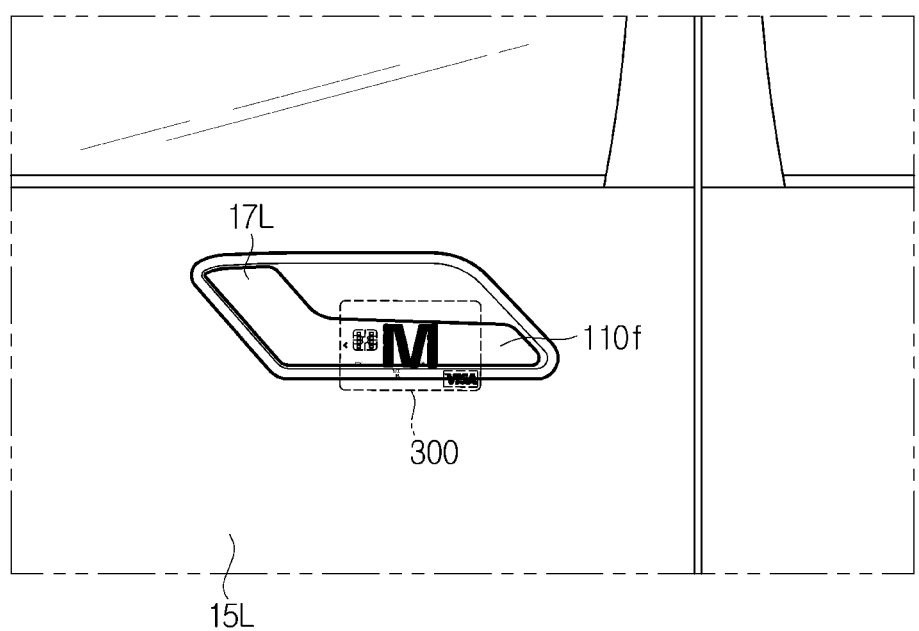

Further, as shown in FIG. 8, the sensor may be provided in the handle 17 of the door 15 of the vehicle.

In FIGS. 6 to 8, although various locations where the sensor of the sensing unit 110 may be provided have been described, the locations where the sensors may be provided are not limited thereto, and the sensor may be provided at various locations in the interior and exterior of the vehicle 100.

The communicator 120 may transmit the first signal including the unique identification information of the vehicle 100 generated by the controller 150 to the server 160, may receive the second signal from the smart card 300 when the smart card 300 is sensed by the sensing unit 110, and may transmit the received second signal to the controller 150.

Therefore, the communicator 120 may communicate with the server 160 and the smart card 300 using various schemes. Information may be transmitted to and received from the server 160 using various schemes such as radio frequency (RF), wireless fidelity (Wi-Fi), Bluetooth, Zigbee, near-field communication (NFC), ultra-wide band (UWB) communication, and the like. The method of communicating with the server 160 disclosed herein is not limited to the above-described schemes, and any scheme that enables the method of communicating with the server 160 may be used.

In addition, in FIG. 3, the communicator 120 is shown as a single element configured to transmit and receive a signal, but embodiments are not limited thereto. The communicator 120 may be separately provided as a transmitter (not shown) configured to transmit a signal and a receiver (not shown) configured to receive a signal.

The storage 130 may be controlled by the controller 150 to store a signal generated by the controller 150, a signal received by the communicator 120, and a variety of information on the smart card 300.

In detail, the storage 130 may store the first signal including the unique identification information of the vehicle 100 generated by the controller 150, the second signal received from the smart card 300 by the communicator 120, and a variety of information on the registered smart card 300 when the smart card is registered in the vehicle 100 through a normal procedure.

Therefore, the storage 130 may be implemented as at least one among a nonvolatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), or a storage medium such as a hard disk drive (HDD) or a CD-ROM, but embodiments of the present disclosure are not limited thereto. The storage 130 may be a memory implemented as a chip provided separately from a processor, which will be described below in connection with the controller 150, or may be implemented as a single chip provided with a processor.

The display 140 may display a variety of information related to the registration procedure of the smart card 300, the smart card 300, and the vehicle 100.

Therefore, the display may include a display panel (not shown) to express the above information, and the display panel may employ a cathode ray tube (CRT) display panel, a liquid crystal display (LCD) panel, a light emitting diode (LED) panel, an organic light emitting diode (OLED) panel, a plasma display panel (PDP), a field emission display (FED) panel, or the like.

When the display 140 is implemented as a touch display, the display 140 may include a touch display panel (not shown) configured to receive a user input, and the user may perform the registration procedure of the smart card 300 through the touch display panel.

The controller 150 may control each element included in the vehicle 100, and may simultaneously determine whether the smart card 300 has the authority to control the vehicle 100 based on the first signal stored in the storage 130 and the second signal received from the smart card 300 by the communicator 120.

In detail, when the second signal is generated based on the first signal, the controller 150 may determine that the smart card 300 has the authority to control the vehicle 100.

At this time, the first signal includes unique information of the vehicle 100 distinguished from unique information of other vehicles, and the second signal may include a signal generated by the server 160 based on the first signal. In detail, the second signal may include the unique information of the vehicle 100, while being a signal obtained from the first signal.

For example, when the first signal generated by the controller 150 includes a signal a, and a signal b obtained from the signal a by the server 160 is included in the second signal, the controller 150 may analyze the second signal to determine whether the signal b included in the second signal is a value obtained from the signal a.

When the signal b is a value obtained from the signal a, the smart card 300 corresponds to a legally issued card of the user, so that the controller 150 can determine that the smart card 300 has the authority to control the vehicle 100, and may store the information on the smart card 300 in the storage 130.

However, when the signal b received from the smart card 300 by the vehicle 100 is not a signal obtained from the signal a, the smart card 300 does not correspond to the card of the user, so that the controller 150 cannot go through the registration procedure.

In addition, when the smart card 300 is determined to have the authority to control the vehicle 100, the controller 150 may authorize the smart card 300 to control at least one of the door 15, a trunk, and a power source of the vehicle 100. Therefore, the user may open or lock the door 15 of the vehicle 100 using the smart card 300, and may turn on/off the power of the vehicle 100.

Further, the controller 150 may store the information on the smart card 300 in the storage 130 when the smart card 300 is determined to have the authority to control the vehicle 100.

The controller 150 may delete the information on the smart card 300 stored in the storage 130 to prevent the vehicle 100 from being stolen when another smart card is registered in the vehicle by the user after the information on the smart card 300 is stored in the storage 130.

In addition, a deletion option may be changed by a setting of the user, and types and the number of smart cards 300 that can be registered in the vehicle 100 is not limited and may be variously set by the user according to a use environment.

Further, in order to safely perform the registration procedure of the smart card 300, the controller 150 may determine whether the smart card 300 has the authority to control the vehicle 100 only when the remote control device 400 is present in the interior of the vehicle 100.

Moreover, when an authentication controller (not shown) configured to serve as the controller 150 is abnormally replaced due to theft, there is a possibility of vehicle theft, so that the controller 150 and the remote control device 400 may communicate with each other using an encryption key obtained through a mutual learning process. Therefore, even when only the authentication controller (not shown) is replaced, the authentication controller may not communicate with the remote control device 400, so that the registration procedure of the smart card 300 may not be performed. The security of the vehicle 100 may be improved through such a process.

In addition, the controller 150 may inform the user of an authentication process and a registration state of the smart card 300 in various manners. For example, the user may be informed through the display 140, and a head up display (HUD) may be used.

Further, the controller 150 may be implemented as a memory (not shown) configured to store an algorithm for controlling an operation of elements in the vehicle 100 or data for a program reproducing the algorithm, and a processor (not shown) configured to perform the above-described operation using the data stored in the memory. At this time, the memory and the processor may be implemented as separate chips. Alternatively, the memory and the processor may be implemented in a single chip.

Figure 9:
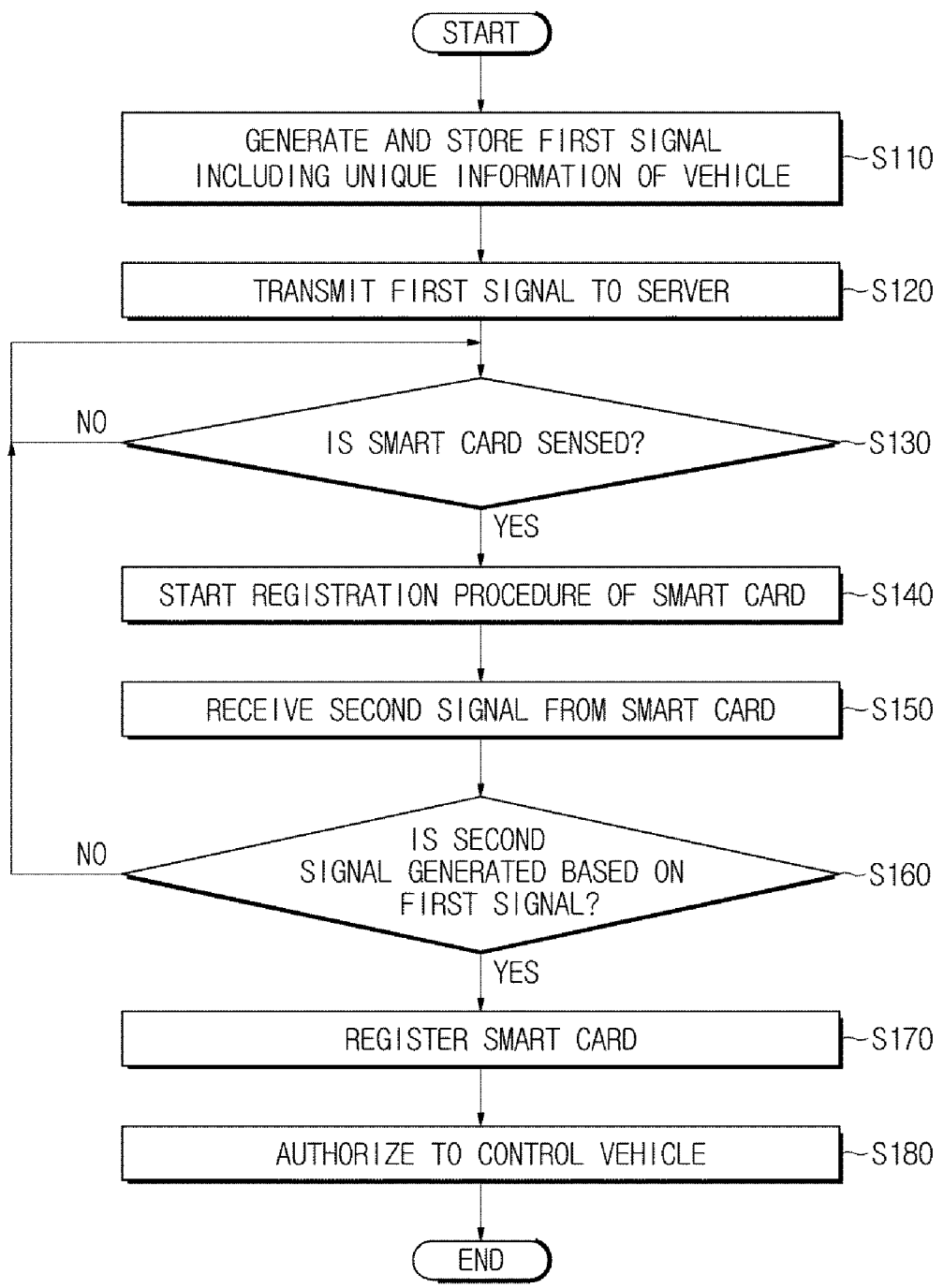
FIG. 9 is a flowchart illustrating a method of controlling a vehicle in accordance with embodiments of the present disclosure.
Figure 10:
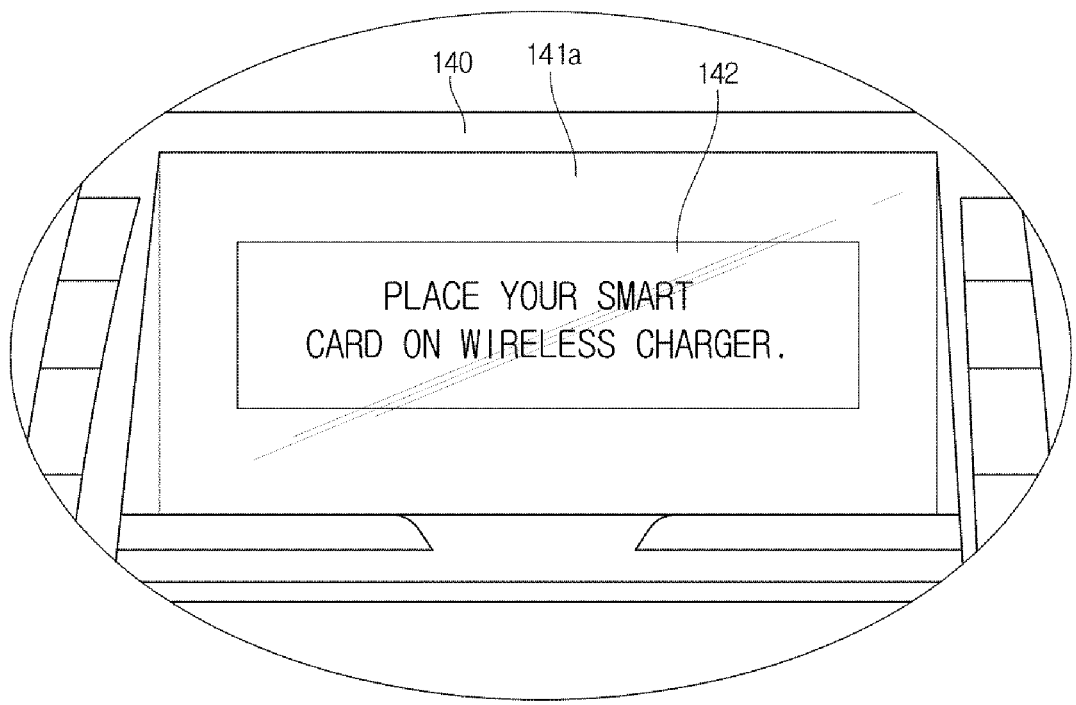
FIG. 10 is a view illustrating a part of a process of registering a smart card in accordance with embodiments of the present disclosure.

FIG. 9 is a flowchart illustrating a method of controlling a vehicle 100 in accordance with embodiments of the present disclosure, and FIG. 10 is a view illustrating a part of a process of registering a smart card 300 in accordance with embodiments of the present disclosure.

As shown in FIG. 9, the vehicle 100 may generate and store a first signal including the unique information (S110).

The first signal refers to a signal including the unique information of the vehicle 100 distinguished from the unique information of other vehicles. The first signal may be set and generated in a process of manufacturing the vehicle in advance, or may be generated when the registration procedure of the smart card 300 is to be performed.

When the first signal has been generated, the vehicle 100 may transmit the first signal to a server 160 (S120).

In addition, the server 160 that has received the first signal may generate a second signal to be stored in the smart card 300 based on the first signal, and may store the second signal in a server storage (not shown).

In detail, the second signal may include the unique information of the vehicle 100, and may simultaneously include information about the signal obtained from the first signal. Thereafter, although not shown in the drawing, the generated second signal may be stored in advance in the smart card 300 to be issued, or information about the second signal may be stored in the smart card 300 through an update performed by the user.

Thereafter, the vehicle 100 may sense the smart card using sensors installed at various locations of the vehicle 100 (S130).

Since the sensed smart card 300 means that the user intends to register the smart card 300 in the vehicle 100, the vehicle 100 may perform the registration procedure of the smart card when the smart card 300 is sensed (S140).

When the registration procedure is performed, as shown in FIG. 10, the vehicle 100 may display a screen 141*a* related to a registration process of the smart card 300 through the display 140.

As shown in FIG. 10, a pop-up window 142 may be used to provide the user with information required to perform the next procedure. In addition, although not shown in the drawing, information on the registration process, time required for registration, and the like may be displayed together.

In addition, although not shown in the drawing, when the sensor senses the smart card 300 that has been already registered in operation S130, this is not a case where a new smart card 300 is to be registered, so that the registration procedure may not be performed in this case.

Further, even when the smart card 300 is sensed in operation S130, when a remote control device 400 of the vehicle 100 is not present in the vehicle 100, the registration procedure of the smart card 300 may not be performed for the purpose of a stable registration procedure of the smart card 300.

When the registration procedure of the smart card is performed by operation S140, the vehicle 100 may receive the second signal from the smart card 300, and may determine whether the second signal is generated based on the first signal (S150 and S160).

In detail, when the first signal generated in operation S110 includes a signal a, and the second signal includes a signal b obtained from the signal a by the server 160, the vehicle 100 may analyze the second signal and may determine whether the signal b included in the second signal is a value obtained from the signal a.

When the signal b is a value obtained from the signal a, the smart card 300 corresponds to the legally issued card of the user, so that the vehicle 100 may determine that the smart card 300 has the authority to control the vehicle 100, and may store the information on the smart card 300 in the vehicle 100 (S170 and S180).

However, when the signal b received from the smart card 300 by the vehicle 100 is not a signal obtained from the signal a, the smart card 300 does not correspond to the card of the user, so that the vehicle 100 does not go through the registration procedure.

In addition, when the smart card 300 is determined to have the authority to control the vehicle 100, the vehicle 100 may authorize the smart card 300 to control at least one of a door 15, a trunk, and a power source of the vehicle 100. Therefore, the user may open or lock the door 15 of the vehicle 100 using the smart card 300, and may turn on/off the power of the vehicle 100.

Figure 11:
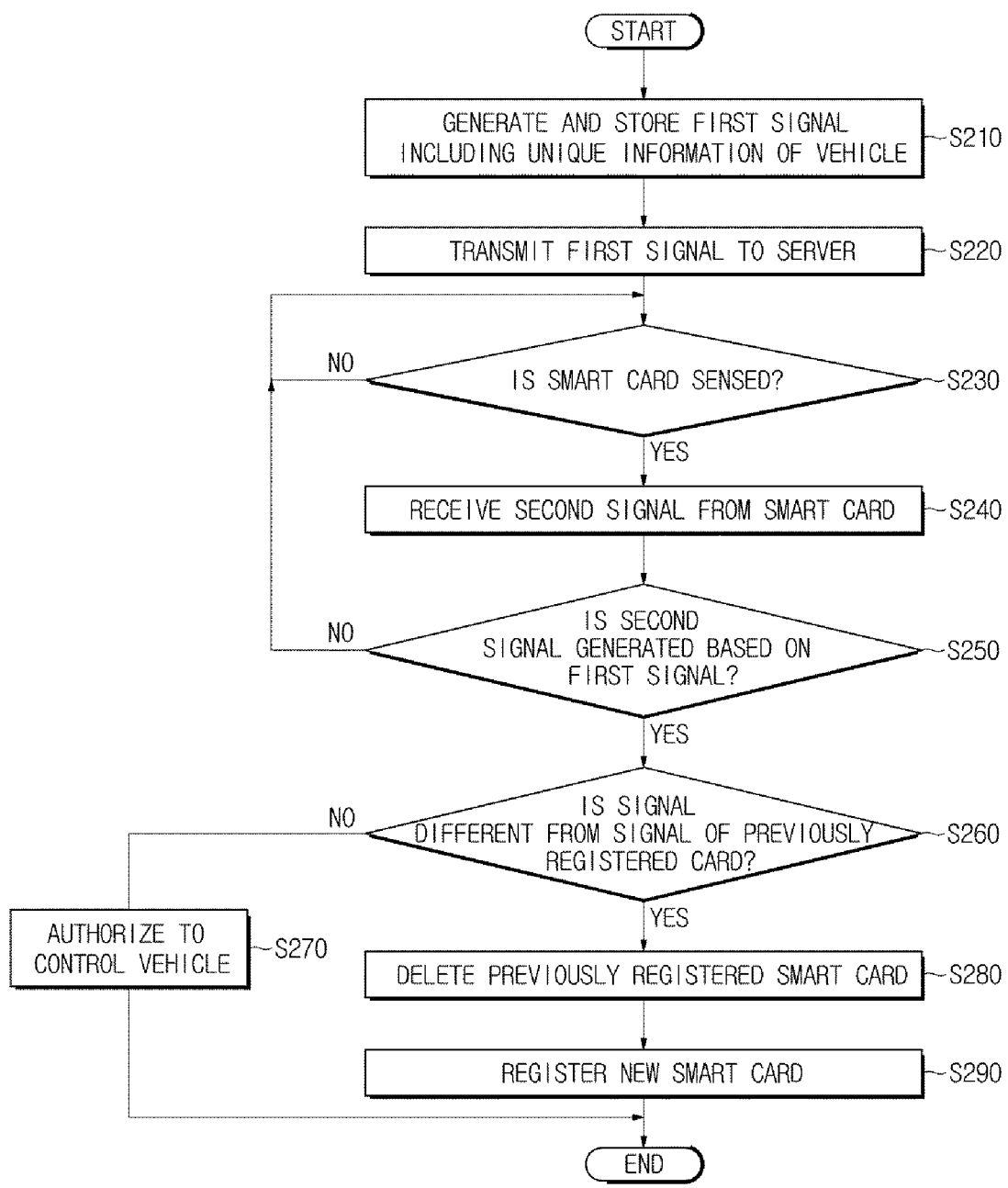
FIG. 11 is an additional flowchart illustrating a method of controlling a vehicle in accordance with embodiments of the present disclosure.
Figure 12:
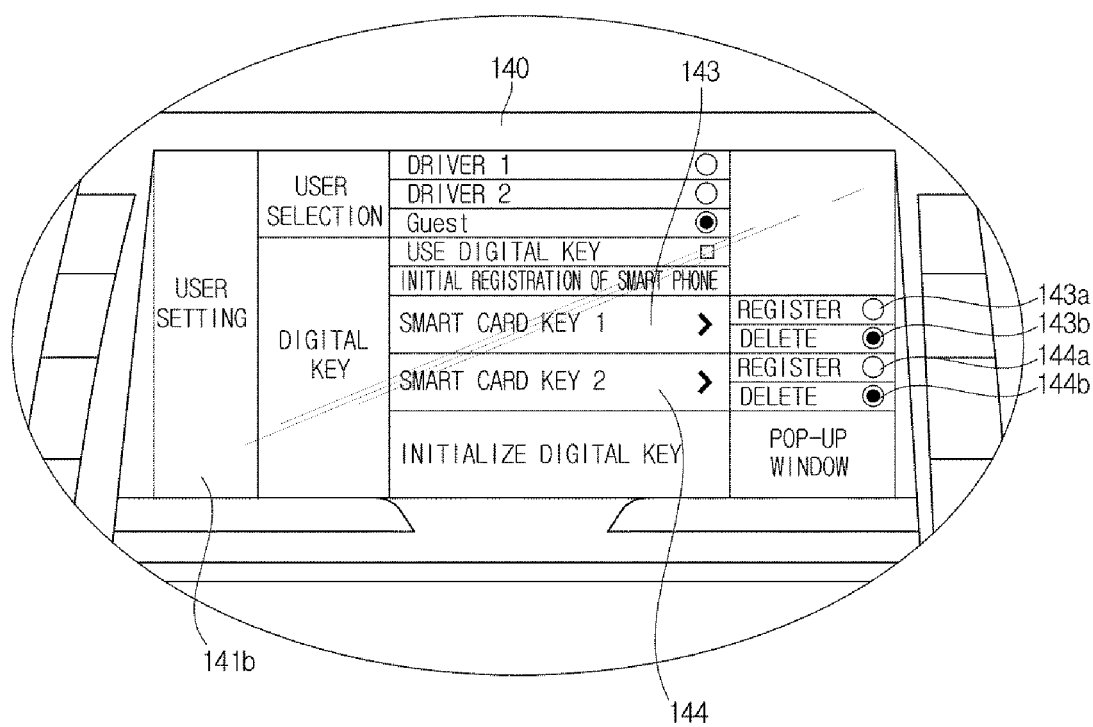
FIG. 12 is a view illustrating one example of registering a plurality of smart cards in accordance with embodiments of the present disclosure.

FIG. 11 is an additional flowchart illustrating a method of controlling a vehicle in accordance with embodiments of the present disclosure, and FIG. 12 is a view illustrating another example of registering a plurality of smart cards in accordance with embodiments of the present disclosure.

FIG. 11 is a view illustrating a process of registering a plurality of smart cards 300 in a vehicle. Since operations S210 to S250 correspond to operations S110 to S160 shown in FIG. 10, the description thereof will be omitted.

When a server 160 generates a second signal based on a first signal, there is no problem when only one smart card 300 is issued. However, when a plurality of smart cards 300 are issued, the smart cards 300 are required to include information for identifying the plurality of smart cards 300.

In addition, when the plurality of smart cards 300 are issued, a security problem may occur due to a lost card.

Therefore, the server 160 in accordance with embodiments of the present disclosure may generate the second signal based on the first signal when the user intends to issue a plurality of cards, such that second signals are generated as signals that can be distinguished from other second signals.

For example, when the first signal received by the vehicle 100 includes information about a signal a, the server 160 may generate a signal b based on the signal a. In addition, when there is a request to issue another smart card 300 for the same vehicle, since another smart card 300 is required to include information about the vehicle 100, a signal is required to be generated based on the signal a, while being distinguished from the signal b, so that a signal b' may be generated.

Since the signals b and b' include the signal a, the smart card 300 may be registered in the vehicle. At the same time, the vehicle 100 may recognize mutually different smart cards 300 through the signals b and b'.

Therefore, operations S260 to S290 shown in FIG. 11 are processes for describing such a procedure.

When it is determined in S250 that the second signal is a signal generated based on the first signal, the vehicle 100 may determine whether the second signal is a signal different from a second signal of a previously registered smart card 300 (S260).

When the second signal is different from the second signal of the previously registered smart card 300 as described above, it means that the user is intending to register a new smart card 300, so that the user goes through a procedure for registering the new smart card 300 (S280 and S290).

As shown in FIG. 12, a display 140 of the vehicle 100 displays a screen 141*b* including various information, so that a command for registering the smart card 300 may be input from the user.

Therefore, the user may select a register icon 143*a* when the user desires to register a first smart card, and may select a delete icon 143*b* when the user desires to delete the first smart card.

In a state where the first smart card is stored, the user may select a register icon 144*a* when the user desires to register a second smart card, and may select a delete icon 144*b* when the user desires to delete the second smart card.

When the second signal of the smart card sensed in operation S260 is the same as the second signal of the previously registered smart card, it is not the procedure for registering a new smart card, so that the vehicle 100 may authorize the smart card 300 to control the vehicle 100.

When a plurality of smart cards 300 are registered as shown in FIG. 12, unique identification numbers different from each other are used, so that a lost smart card 300 may be no longer available by deleting only information on the lost smart card even when some of the plurality of smart cards 300 are lost, thereby improving security of the vehicle 100.

Figure 13:
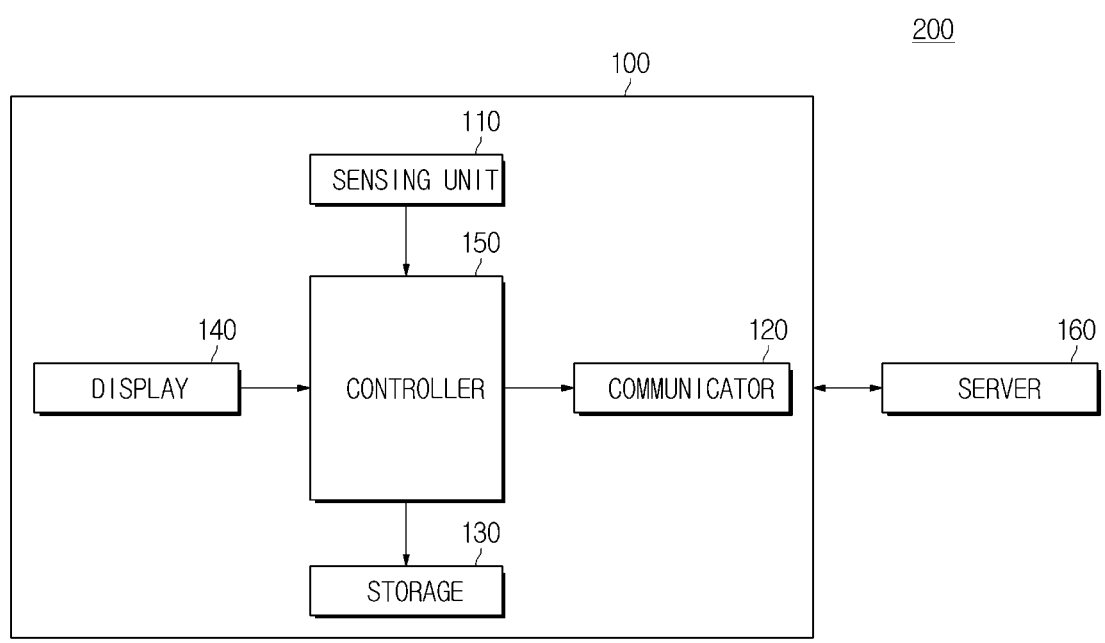
FIG. 13 is an additional block diagram illustrating elements of a vehicle system in accordance with embodiments of the present disclosure.

FIG. 13 is an additional block diagram illustrating elements of a vehicle system in accordance with embodiments of the present disclosure.

As shown in FIG. 13, a vehicle system 200 may include a sensing unit 110 capable of sensing a smart card 300 and a remote control device 400, a communicator 120 configured to transmit a first signal to a server 160 and receive a second signal from the smart card 300, a storage 130 configured to store information about a user and the smart card, a display 140 configured to display various information about a vehicle 100, a controller 150 configured to perform a registration procedure for the smart card 300 based on a first signal stored in the storage 130 and a second signal received from the smart card 300, and the server 160 configured to generate the second signal based on the first signal received from the communicator 120 and store the generated second signal in the smart card 300.

In FIG. 13, the descriptions of the sensing unit 110, the communicator 120, the storage 130, the display 140, and the controller 150, which are the elements of the vehicle 100, are the same as the descriptions given with regard to FIG. 5, so that the redundant description will be omitted, and the server 160 that is not described in FIG. 5 will be described.

The server 160 may generate the second signal based on the first signal received from the communicator 120. When a plurality of first signals are received from the communicator 120, the server 160 may determine that the user is intending to issue a plurality of smart cards 300, and may generate a plurality of second signals corresponding to the number of smart cards 300. The generated second signal may be stored in each of the smart cards 300.

For example, when the first signal includes information about a signal a, the server 160 may generate a signal b based on the signal a. In addition, when there is a request to issue another smart card 300 for the same vehicle, the second signal is required to include the information about the vehicle 100, so that the second signal may include a signal b' generated based on the signal a while being distinguished from the signal b.

In other words, since the signals b and b' include the signal a, which is the unique information of the vehicle 100, the plurality of smart cards 300 may be registered in the vehicle. At the same time, the vehicle 100 may recognize mutually different smart cards 300 through the signals b and b'.

In addition, the first signal received from the communicator 120 and the second signal generated based on the first signal may be stored in the server 160.

Figure 14:
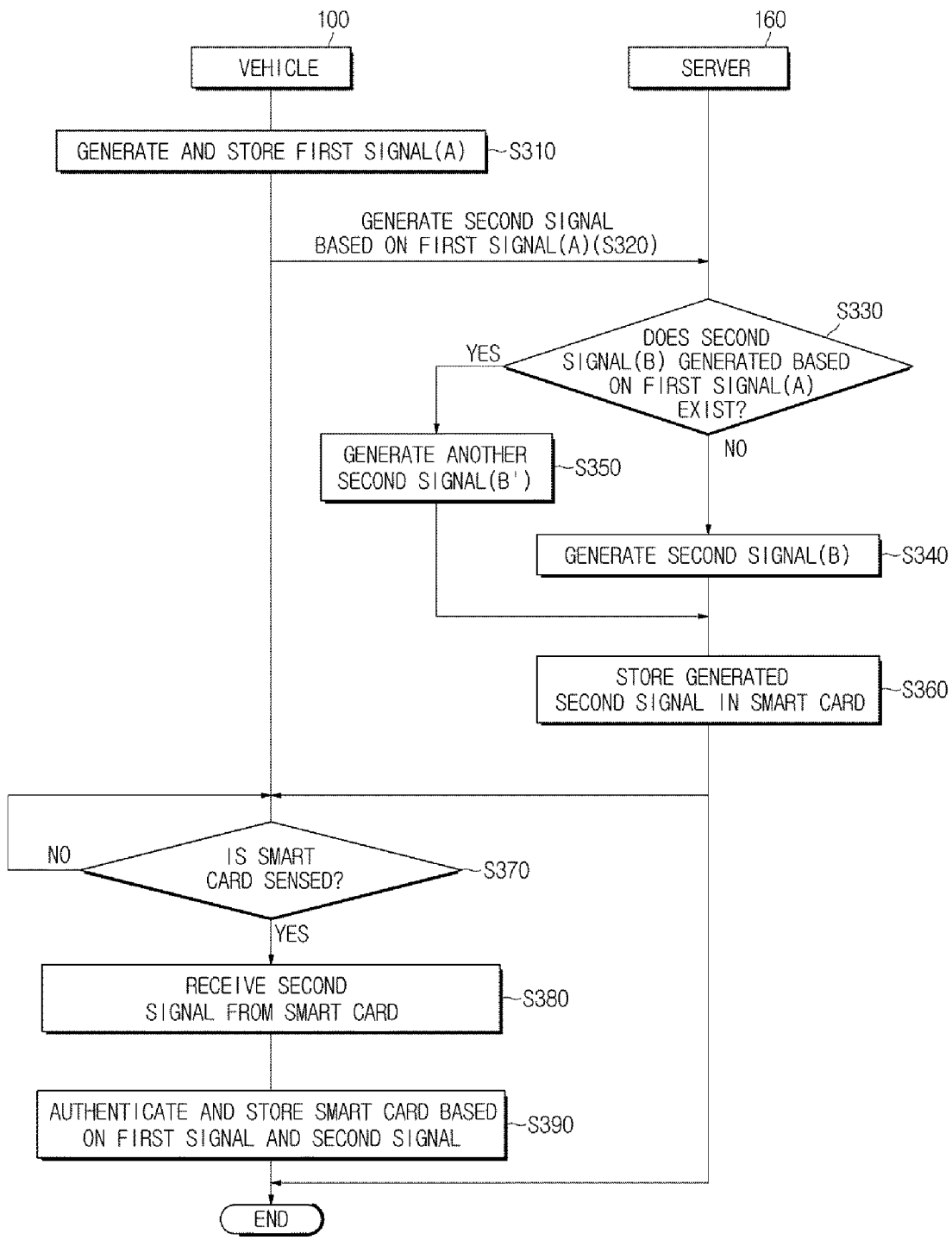
FIG. 14 is an additional flowchart illustrating a method of controlling a vehicle system in accordance with embodiments of the present disclosure.

FIG. 14 is an additional flowchart illustrating a method of controlling a vehicle system in accordance with embodiments of the present disclosure. Although FIG. 14 mainly illustrates a procedure of registering a plurality of smart cards 300, an operation sequence of the vehicle system 200 is not limited thereto.

As shown in FIG. 14, the vehicle may generate and store a first signal including unique information (S310).

The first signal refers to a signal including unique information of a vehicle 100 distinguished from the unique information of other vehicles. The first signal may be set and generated in a process of manufacturing the vehicle in advance, or may be generated when the registration procedure of the smart card 300 is to be performed.

When the first signal has been generated, the vehicle 100 may transmit the first signal to a server 160 (S320).

The server 160 that has received the first signal may generate a second signal to be stored in the smart card 300 based on the first signal. Before generating the second signal, the server 160 may determine whether a second signal b generated based on a first signal a exists or not (S330).

When the second signal b generated based on the first signal a does not exist, the smart card 300 is firstly registered, so that the server 160 may generate the second signal b.

However, when the second signal b generated based on the first signal a exists, there is a smart card that has been previously issued, so that the server 160 may generate a second signal based on the first signal, such that the second signal includes a signal b' distinguished from the signal b (S350).

Since the description of the first signal and the second signal has been described in detail above, it will be omitted in the following description.

The second signal generated by the server 160 may be stored in the smart card 300 in advance, or the information about the second signal may be stored in the smart card 300 through the update performed by the user. When a plurality of second signals are generated, mutually different second signals may be stored in a plurality of mutually different smart cards 300 (S360).

Thereafter, the vehicle 100 may sense the smart card 300 using sensors installed at various locations of the vehicle 100, and the second signal may be received from the smart card 300 when the smart card 300 is sensed (S370 and S380).

In addition, the vehicle performs the registration procedure of the smart card based on the first signal and the second signal, and the information on the smart card 300 may be stored in the vehicle 100 when the registration is successful (S390).

Operations S370 to S390 are similar to those described with reference to FIGS. 9 and 11, so the detailed description thereof will be omitted.

The vehicle 100 and the vehicle system 200 in accordance with embodiments of the present disclosure have been described above with reference to the drawings.

Since an conventional remote control device is required to be supplied with power to perform the near-field communication with the vehicle, when a battery of the remote control device is fully discharged or the remote control device is inoperable (e.g., due to a power failure), it can be difficult to use the vehicle.

As is apparent from the above description, in the vehicle 100 and the vehicle system 200 in accordance with embodiments of the present disclosure, when the battery of the remote control device is fully discharged or the remote control device is inoperable due to a failure, the vehicle can be used with the smart card, so that the above-referenced inconvenience of the user may be prevented. In addition, since the registration is performed with the unique value during the registration process of a card, a third party may be prevented from inappropriately using the vehicle.

Although certain embodiments have been shown and described with reference to the accompanying drawings, it will be apparent to those skilled in the art that various modifications and variations can be made from the above descriptions. For example, appropriate results may be achieved even when the described techniques are performed in an order different from the described method, and/or the described elements such as systems, structures, devices, circuits, and the like are coupled or combined in forms other than the described method, or substituted or switched with other elements or equivalents. Therefore, other embodiments and equivalents to the claimed subject matter are within the scope of the appended claims.

What is claimed is:

1. A vehicle comprising:
a controller configured to authorize with a smart card as an auxiliary device for controlling the vehicle when a remote control device is failed or discharged, and when the smart card is authenticated, generate a first signal; and
a communicator transmitting the first signal to an external server, and receiving a second signal from the smart card storing the second signal, the second signal being generated based on the first signal,
wherein, when the smart card is authenticated, the controller authorizes the smart card based on the first signal and the second signal,
wherein the controller deletes information of the smart card stored in a storage when another smart card is authorized by the controller to control the vehicle.

2. The vehicle according to claim 1, wherein the controller authorizes the smart card to control the vehicle when the second signal is generated based on the first signal.

3. The vehicle according to claim 1, wherein the controller authorizes the smart card to control at least one of a door, a trunk, and a power source of the vehicle when the smart card is authorized to control the vehicle.

4. The vehicle according to claim 1,
wherein the controller controls the storage so as to store the information of the smart card when the smart card is authorized to control the vehicle.

5. The vehicle according to claim 1, wherein the first signal includes unique information of the vehicle distinguished from unique information of other vehicles.

6. The vehicle according to claim 1, wherein the controller authorizes the smart card to control the vehicle based on whether information obtained from the first signal is included in the second signal.

7. The vehicle according to claim 1, further comprising a sensing unit sensing the smart card,
wherein the controller authorizes the smart card to control the vehicle when the smart card is sensed by the sensing unit.

8. The vehicle according to claim 7, wherein the sensing unit is disposed in at least one of an ignition button, a door, a handle, a center fascia, and a display of the vehicle.

9. The vehicle according to claim 1, wherein the controller authorizes the smart card to control the vehicle when the remote control device of the vehicle is present in an interior of the vehicle.

10. A vehicle system comprising:
a vehicle including a controller configured to authorize with a smart card as an auxiliary device for controlling the vehicle when a remote control device is failed or discharged, and when the smart card is authenticated, generate a first signal and a communicator transmitting the first signal; and
a server receiving the first signal from the communicator, generating a second signal based on the first signal and storing the generated second signal in the smart card, wherein
the communicator receives the second signal from the smart card, and
when the smart card is authenticated, the controller authorizes the smart card to control the vehicle based on the first signal and the second signal, when the smart card is authorized to control the vehicle, store information of the smart card, and when another smart card is authorized by the controller to control the vehicle, deletes information of the smart card stored in the storage.

11. The vehicle system according to claim 10, wherein the controller authorizes the smart card to control the vehicle when the second signal is generated based on the first signal.

12. The vehicle system according to claim 10, wherein the controller authorizes the smart card to control at least one of a door, a trunk, and a power source of the vehicle when the smart card is authorized to control the vehicle.

13. The vehicle system according to claim 10, wherein the first signal includes unique information of the vehicle distinguished from unique information of other vehicles.

14. The vehicle system according to claim 10, wherein the controller authorizes the smart card to control the vehicle based on whether information obtained from the first signal is included in the second signal.

15. The vehicle system according to claim 10, wherein the server generates a plurality of second signals, each of which including different information, when a plurality of first signals are received from the communicator.

16. The vehicle system according to claim 15, wherein the server stores the plurality of second signals in a plurality of smart cards, respectively.

17. The vehicle system according to claim 10, wherein the controller controls the storage so as to store information of a plurality of smart cards when the plurality of smart cards are authorized to control the vehicle.

* * * * *